Aug. 28, 1962  R. OLDENBURGER  3,051,138
HYDRAULIC GOVERNORS

Filed June 7, 1960 2 Sheets-Sheet 1

INVENTOR.
RUFUS OLDENBURGER
BY George M. Soule
ATTORNEY

INVENTOR.
RUFUS OLDENBURGER

United States Patent Office 3,051,138
Patented Aug. 28, 1962

3,051,138
HYDRAULIC GOVERNORS
Rufus Oldenburger, West Lafayette, Ind., assignor to Curtiss-Wright Corporation, New York, N.Y., a corporation of Delaware
Filed June 7, 1960, Ser. No. 34,498
18 Claims. (Cl. 121—42)

This invention relates to improvements in hydraulic governors, particularly speed governors for engines and other prime movers.

The principal object of the invention is to provide a simple and relatively inexpensive hydraulically operated speed governor or automatic control mechanism having response both to amount of detected error (as of speed) and rate of change of error (i.e., having proportional and derivative response operation) but without employing floating hence erratic proportional or dashpot pistons, therefore viscosity-sensitive needle valves, and without requiring complicated hence expensive types of control valve mechanisms, the governor having adjustment capabilities making it far more versatile than conventional hydraulic governors for adaptation to a larger variety of engines.

A further object is to provide a proportionally plus rate responsive hydraulic governor which is relatively independent of viscosity of operating fluid and erratic effects of friction; wherein the governor output motor, hereinafter usually main servomotor or power piston unit, can be disposed remotely of the main governor casing with a minimum number of hydraulic lines; wherein all control passage portions of the hydraulic system are always at above atmospheric pressure to avoid foam in the operating oil and generally to attain accuracy and symmetry of performance; wherein adjustments of the usual constants, particularly overall governor gain constant, governor time constant or lag and derivative (rate) constant can be effected independently of each other and over sufficiently wide ranges to enable operation on or for engines of widely different types; and wherein a single embodiment of the governor mechanism can be operated: (a) as a simple isochronous governor without internal feedback; (b) as a simple speed droop governor with minimum complications; (c) as a proportionally plus rate responsive governor; and (d) as an electrical load change or transient responsive governor.

An additional object is to provide an improved hydraulic governor capable of design or adjustment to enable non-linear response such as fast response for large speed errors and slower response for small speed errors.

Other objects and features of the invention will become apparent from the following description in reference to the accompanying drawings, wherein.

Figure 1:
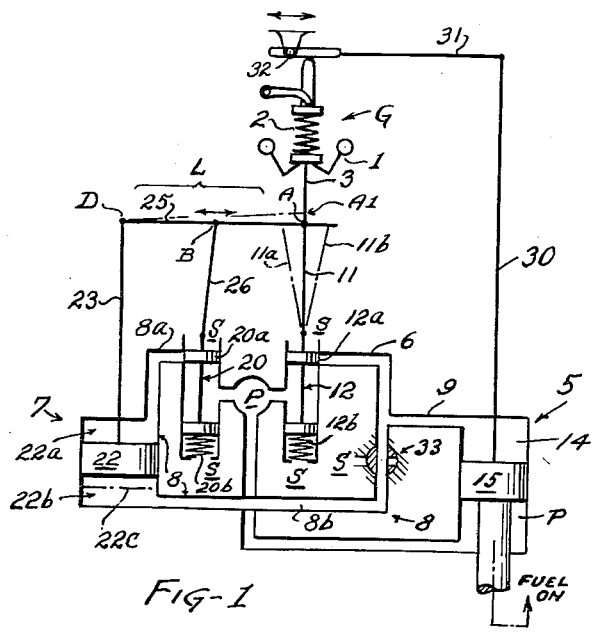
FIG. 1 is a schematic view showing a relatively simple form of the present governor mechanism having a differential type main servomotor.

The present governor as shown herewith in the various views includes a speed sensing unit of suitable type connected to a pilot valve mechanism which will control flow of operating fluid to the governor output or main servomotor in a manner approximately proportionally to detected amounts of speed error and additionally a differentiating or "rate" piston or movable wall member controlled by a separate "rate" valve of said mechanism adjustably connected for differentiating flow control operation by the speed sensing unit and arranged hydraulically in parallel with the main servomotor control circuit so that the motion of the rate piston or wall member modifies with negligible lag the motion of the power piston as required for accurate proportional plus integrating or derivative governor response action. The rate valve portion of said pilot valve mechanism has a neutral-position-restoring or automatic feedback linkage connection with the rate piston or wall member and which is adjustable to enable or compel whatever damping or engine-response-mating stabilizing action is needed. The linkage used enables mutually independent adjustments of governor gain constant ($K_2$), derivative (rate) constant ($T_d$) and governor time or lag constant ($T_g$).

The symbols just given above and others appearing later herein are those used in hydraulic governor analyses appearing in an article "Regulators" Section No. 18 (by R. Oldenburger) of Control Engineers Handbook, 1st edition, 1958. Governor formulae given herein without special comment as to source are from that article.

In the various forms of the present governor described below the directions "up," "down," "left," "right," etc. as given are of no technical significance, being used for convenience only.

Basic Arrangement

The simplest herewith-illustrated form, FIG. 1, of the present governor mechanism unit has a substantially constant pressure source P of hydraulic pressure fluid such as oil, a centrifugally acting speed-error measuring unit (ballhead or tachometer G having flyballs 1 and settable speeder spring 2) connected as by a spindle 3 to a pilot valve plunger 12 (hereinafter usually pilot valve 12) for movement of that valve out of its illustrated neutral or steady-state position in opposite directions to control a main governor output or servomotor 5. The pilot valve 12 functions to control the operating effect of the pressure oil through a channel or passage 6 leading to a control chamber 14 of main governor output servomotor piston 15 for prime-mover-regulating (e.g. fuel metering) movement of the piston 15 in opposite directions generally (or exactly) proportionally to amounts of speed error detected by the unit G. Character S indicates sump or negligible pressure areas in the governor casing not shown.

The design (not shown) of the ports of the pilot valve 12 can specially modify the flow coefficient or rate of flow of oil through the passage 6 with a predetermined amount of movement of the valve 12 out of equilibrium or steady-state position, as in order to produce disproportionately larger servomotor piston movements for large speed errors than for small speed errors. Thus servomotor piston movement can be a linear or non-linear function of pilot valve movement, as desired, for any predetermined amount of pilot valve movement or can be substantially proportional to pilot valve movement for any distance of pilot valve opening.

The control passage 6 (hereinafter proportional channel for the just above indicated reason) is connected to the servomotor control chamber 14 (via a junction passage 9 as shown) in parallel with a passage 8 having end or relatively opposite terminal portions $8a$ and $8b$. The passage 8 will usually be referred to hereinafter as a derivative (or rate or differentiating) flow channel for reasons which will be explained or become apparent later.

The servomotor 5 of FIG. 1 is of the type commonly referred to as "differential." At steady-state, oil is trapped in servomotor control chamber 14 by the pilot valve land 12a at a predetermined fraction (e.g. 50%) of the supply pressure P in contact with a smaller area (lower effective end) of the piston 15. The piston 15 moves upwardly to increase fuel as pressure fluid is spilled from control chamber 14 by lowering movement of pilot valve land 12a, the opposite movement of the valve land 12a having the opposite effect, namely to decrease fuel as well understood in the art.

Figure 2:
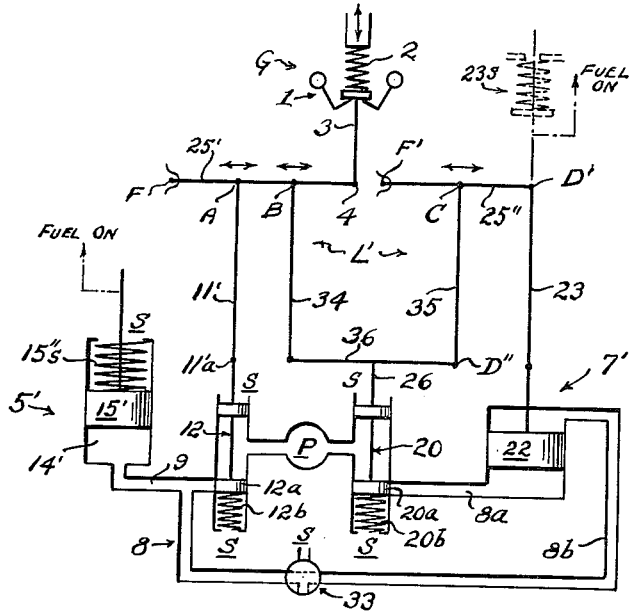
FIG. 2 is a similar schematic view showing the preferred arrangements for adjustment of constants and showing a spring loaded type of main servomotor.

The speed of movement of servomotor piston 15, for derivative or engine-acceleration-responsive fuel metering action of piston 15 is modified by flow in the derivative channel 8 (8 plus 9) through operation of an auxiliary or what may be termed a derivative or rate valve plunger element 20 of the pilot valve mechanism (hereinafter usually rate valve 20) by which the source pressure oil P is controlled for action of an auxiliary servomotor 7 (hereinafter usually rate servo or servomotor). The piston 22 of rate servo 7 forms a movable wall sealingly separating the two parts or end portions 8a and 8b of the rate channel 8 so that, neglecting leakage, the rate servo 7 can be regarded as a constant displacement pump. The portions 8a and 8b of channel 8 are connected to the pressure source P and to the governor servo control chamber 14 respectively, assuming the rate channel 8 contains oil from the supply pressure source P as is preferred in the case of using either a differential type or spring loaded type governor output servomotor (FIGS. 1 and 2).

Rate valve land 20a in the neutral or steady state position of the rate valve 20 blocks the passage 8a from communication with pressure source P; and in other positions either admits oil to or spills oil from the passage portion 8a to control shuttling or back and forth movement of the rate servo piston 22 in the rate passage or channel 8. Downward movement of the rate piston 22 augments flow of oil from proportionally controlled channel 6 to the servomotor 5 and, assuming oil is being fed through channel 6 at a predetermined rate of flow, concurrent upward movement of the rate piston 22 reduces the net rate of oil flow through junction passage 9, hence reduces the speed of movement of servo piston 15. The receiving and discharging chambers of rate servo 7 incident to upward movement of rate valve 20 out of equilibrium position are identified 22a and 22b respectively.

In order for the action of the rate valve portion of the pilot valve mechanism and rate servo 7 to cause governor output movement or response as a function of rate of change of speed errors detected by unit G, feedback or followup linkage generally designated L can, for example, be arranged as follows. A floating lever 25 has pivotal connections as at A to governor spindle 3; as at B, to the operating stem 26 of rate valve 20 and, as at D, to stem 23 of rate piston 22 movable through a seal (not shown) in the upper wall of chamber 22a. Rate piston 22 thereby, during occurrence of speed error, temporarily establishes a fixed fulcrum at D for the floating lever 25 so that as the rate valve 20 is moved up or down the resulting movement of rate servo piston 22 operates (following designed lag in the system) to restore the rate valve to closed position. The amount of initial movement of the rate valve 20 with or consequent upon a predetermined speed-error-responsive movement of the governor spindle 3 is in large part a function of the ratio of effective lever arms A D and D B which would be made subject to adjustment as by movement of pivot point B in the direction indicated by the double arrow above that pivot point. Movement of pivot B along the lever 25 adjusts, principally at least, the derivative time or acceleration constant $T_d$ of the governor unit. The arrangement according to FIG. 1 can also enable adjustment of proportional coefficient hence governor gain (gain constant $K_2$ usually) e.g., through connection of link 11 at various points along the lever 25 as indicated by dotted lines 11a and 11b. Other desirable combinations of adjustments are preferably accomplished by the use of additional linkage such as will be described in connection with FIGS. 2 and 4. Points A and B would be movable past each other in an actual physical construction, cf. FIG. 3.

*Operation*

In operation, assuming, for example, a sudden load reduction hence sudden overspeed error occur, pivot point A of lever 25 is moved (as to A1) so that both the pilot valve 12 and the rate valve 20 open upwardly simultaneously. Inevitable lags are neglected in the following discussion. The pilot valve 12 routes pressure oil to servomotor 5 to cause its piston to move downwardly and reduce fuel and the rate valve 20 (usually designed with a high flow coefficient or scale) initiates pumping action of piston 22 hence flow via portions 8a and 8b of derivative channel 8 to increase the speed of main servo piston movement during acceleration hence increase of main servo piston speed over the proportional response that would have occurred solely through the upward opening of pilot valve 12. Thereby the amount of speed error is minimized by the derivative response action as in the case of hydraulic isochronous governors using dashpots with adjustable orifices (needle valves) for proportional and derivative or acceleration response action, but the result is accomplished hereby without using floating piston members subject to sticking friction and through use of sharp edged valve ports or orifices as against viscosity-sensitive orifices (e.g. needle valves).

When engine acceleration ceases with or subsequent to but as a result of fuel-reducing movement of the servo piston 15 to or toward a position requisite for the new load the feedback linkage 23, 25, 26 will have moved the rate valve 20 to or past closed position (depending upon the abruptness of the load change and other factors), so that subsequent downward movement of the governor spindle 3 holds open or reopens the rate valve but now downwardly or in the direction to allow or compel return of the rate piston 22 as from its assumed acceleration-responsive position 22c (exaggerated) to its initial (full-line-illustrated position) as a function of spilling fluid from rate channel portion 8a to sump. Assuming properly designed and/or adjusted lever ratios AD, DB and related flow characteristics of the system via proper design and proportioning of areas of pistons, valve members and valve ports, the return or upward movement of the rate piston 22 will pump or draw oil through the rate passage portion 8b in a direction to subtract from (i.e. add algebraically to) the amount of oil which will continue to be admitted to the servo control chamber 14 by the pilot valve 12 until the speed error is reduced to zero and the pilot valve is closed by operation of tachometer unit G. The subtracting operation just above referred to can be fairly easily designed to be exactly equivalent to the so called "secondary compensation" or leak-off action in an isochronous hydraulic governor using a dash pot; and the fulcrum or reset rate adjustment (at B) is made principally according to the rate of response to fuel change on the part of the particular engine to be governed (engine acceleration "percentage" rating or classification).

The operation in the event of increase of load or the equivalent is exactly the opposite of the operation as described above.

*Spring Loaded Pivots*

It is important in view of the frequently extremely small movements of speed responsive valve elements in hydraulic governors that backlash or lost motion between the operating mechanism and the valves shall be minimized. Since pivot pins and their receiving openings or V-notch equivalents must have either looseness or clearance and since two-way servomotor motion control requires movement of the operating linkage and the valves 12 and 20 in opposite directions it is necessary for the sake of maximum accuracy to maintain as nearly as possible zero backlash. That can be accomplished in the present governor by spring loading of the pilot valve 12 and rate valve 20 toward the linkage L FIG. 1 (or toward the corresponding linkages of FIGS. 2 and 4) by light springs 12b and 20b arranged as will be apparent without further description. The springs 12b and 20b in case the valves are disposed vertically as shown would be selected to have slightly more than sufficient initial force to counterbalance the masses of the valves and directly connected elements.

*Special Purpose Adaptability (Modes)*

In case the main servomotor 5 is part of a self-contained or conventionally governor unit the governor as shown schematically in FIG. 1 and in other forms can be operated with "permanent" speed droop as by conventional linkage 30, 31 and adjustable fulcrum 32, such linkage operating upon the speeder mechanism (via speeder spring 2) as a function of movement of servo piston 15 or other function of load. If however the output servo 5 is remotely of the governor casing, such feedback linkage 30, 31, etc. is expensive and usually has undesirable friction and mass. Therefore the preferred manner of adapting the present governor (all illustrated forms) for operation with permanent speed droop is to disconnect the servomotor piston 15 from the fuel metering means and to connect the latter for operation by the rate servo piston 22 through suitable linkage not shown in FIG. 1, assuming suitable adjustments A, B, etc. have been effected so as to obtain approximately proportional response action by way of the rate valve 20 and piston 22.

Speed droop operation with the present mechanism as just above referred to desirably involves venting of the chamber 22b, FIG. 1, of the rate servomotor 7, and requires spring loading of the rate servomotor for fuel reducing movement as by a spring connected to the ultimate output element, e.g., terminal shaft (not shown) of the governor. Three way valve 33 in derivative channel portion 8b can be used to vent that channel to sump by turning the valve from its illustrated rate-plus-proportional governing position 90 degrees clockwise. Operation of piston 22 (assuming its spring loading as mentioned) as the sole governor output inherently produces speed droop because the increased spring loading force on piston 22 as the piston moves in the fuel increasing direction operates through the linkage L to reduce the steady-state force of speeder spring 2. The percentage or proportional value of speed droop can be adjusted by movement of connecting pivot point B along the lever 25.

For simple isochronous or proportional response operation without feedback in the governor (servo piston 15 then connected to rack or throttle), the rate servo system 8, 20, 22 etc. is inactivated as by already described positioning of the three-way valve 33 to discommunicate passage 8b and 9 and to connect the passage 8b hence the rate servo chamber 22b to sump.

*Modified Adjustment Linkage*

Figure 3:
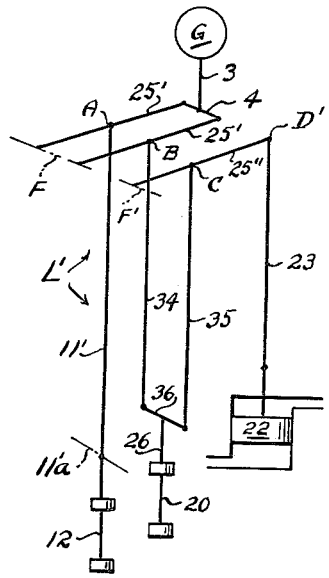
FIG. 3 is a diagrammatic view on the order of a perspective showing one manner in which adjustment of constants can be effected over wide ranges.

In FIGS. 2 and 3 the physical elements and reference points which correspond to or are full operating equivalents of those shown in FIG. 1 are given the same identifying characters (primed or double primed when desirably different from corresponding elements or counterparts in FIG. 1).

Floating lever 25 of FIG. 1 is replaced in FIGS. 2 and 3 by two levers 25' and 25" of linkage L' having respective generally or normally fixed fulcrums at F and F'. FIG. 3 shows more nearly the preferred physical arrangement of levers. The speed measuring unit or tachometer spindle 3 is connected to lever 25' at 4, and operating output points A and B leading to the pilot valve 12 and rate valve 20 respectively are positionable along the lever 25' (as on opposite sides thereof in case 25' is a single lever member or on individual lever elements 25' FIG. 3) so that the pilot valve 12 and rate valve 20 can be moved as independently adjustable functions of predetermined amounts or rates of speed error and over as wide ranges as necessary in controlling the main and rate servomotor pistons 15' and 22 as already described. Levers 25' and 25" for actuation of rate valve 20 and for feedback motion from rate piston 22 to the rate valve 20 are connected to the rate valve stem 26 by links 34 and 35 and a connector 36 which may be an evener yoke pivoted to link 26 and shown as having equal length arms. Pivot points D' and D" and connected portions of the illustrated linkage L' establish temporarily fixed but migrating fulcrums (comparable to pivot D, FIG. 1) during occurrence and continuance of speed errors and form the the necessary motion transmission points for reclosing of the rate valve 20 as a function of rate servo piston motion (e.g. at termination of acceleration and deceleration) substantially as already described.

Adjustment of pivot point A (e.g.) toward connection 4 of lever 25' (or past it if desired, assuming a rightward extension—not shown—of 25') dominates governor gain constant ($K_2$ as in accepted formulas for analyzing governor operations). Movement of pivot point A rightwardly and leftwardly obviously increases and decreases respectively the amount of main servomotor piston movement for a given speed error, thus adjusting the ratio of governor output/input in terms of distance.

Similarly movement of pivot point B of link 34 to the left and right along lever 25' predominantly increases and decreases respectively the value of the derivative (rate) term in such governor formulas (transfer function) without necessarily having any important effect on overall governor gain $K_2$ or on lag in governor operations necessary to eliminate speed errors (e.g. time constant $T_g$ of the usual formula symbol).

The linkage L' also includes means for adjusting the lag or governor time constant $T_g$ substantially independently of the previously identified adjustments providing the adjustments are made in proper order. For lag adjustment as just mentioned and principally for governor stability or to minimize hunting (also, limitedly for filtering out noise), the ratio of feedback movement of the rate servo piston 22 to the rate valve 20 is made adjustable via movement of the point of connection C between the lever 25" and link 35 along the lever 25" through whatever distance is necessary to match the lag of the governor with the noise in the system it is controlling. Leftward adjustment of point C along the lever 25" will increase the time constant ($T_g$) of the governor, that is to say will increase its overall lag independently of or substantially without affecting adjustments available by combinations of movements of points A and B along lever 25.

If the governor time constant adjustment (at point C) and the gain or proportional adjustment (at point A) are made in the order just given, followed by subsequently made derivative adjustment (at point B) for acceleration function or rate response, the rate adjustment will negligibly affect the previously made adjustments.

Figure 4:
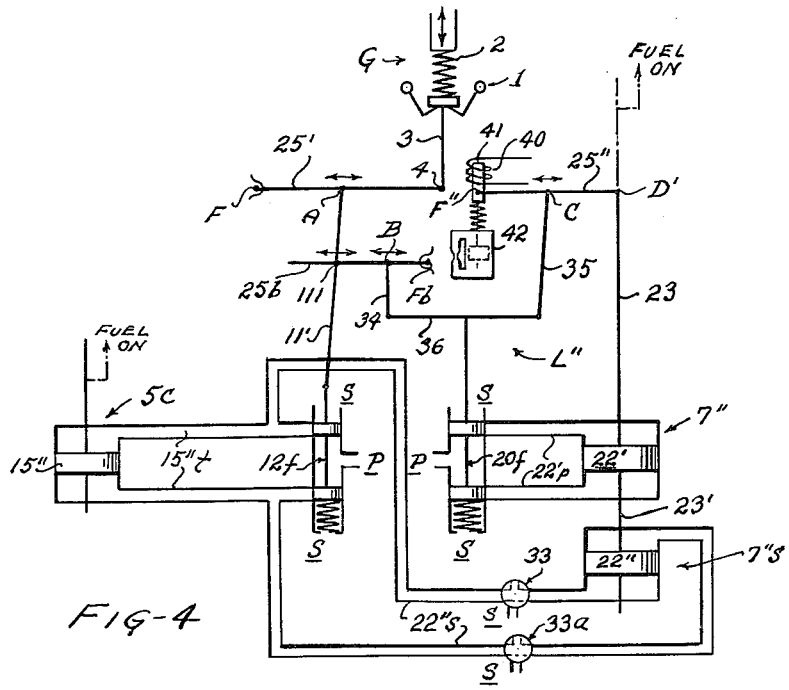
FIG. 4 is a schematic view of a governor mechanism similar to that of FIG. 2 but with hydraulic circuits adapted particularly for use with a double acting servomotor and such as requires four way acting control valves.

*Modified Linkage (Ref. FIG. 4)*

In the linkage L' of FIGS. 2 and 3 adjustments A and B, when performed entirely independently from each other, do not change overall governor gain so as to preserve sometimes desirable product relationships between proportional response and rate response terms or coefficients as in the governor formulas:

$$Z' = -K_2(T_dD+1)N$$

i.e.:

$$Z' = -K_2T_dN' - K_2N$$

wherein Z' is governor output servo piston speed; D is derivative with respect to time, and N and N' represent respectively speed error and rate of change of speed error. The linkage, per FIG. 4, including lever 25b with separate fixed pivot Fb and slider pivot connection 111 between pilot valve operating link 11' and lever 25b compels or requires that the making of adjustment A along tachometer-connected lever 25' will maintain a definite proportionality in effective levers between input to pilot valve 12f and input to rate valve 20f. Thus main servo or governor output performance (e.g. Z') is, for each adjustment A, a different product of constants $K_2$ and $T_d$.

*Mode Selections (Ref. FIG. 2 Cont.)*

For rate plus proportional response operation (FIG. 2) the spring loaded main servo piston 15' is connected to meter fuel, and three way valve 33 is positioned as illustrated.

Use of the mechanism according to FIG. 2 as a simple isochronous governor (servo piston 15' connected to rack or throttle and valve 33 turned counterclockwise 90° from illustrated position) is essentially as already described in connection with FIG. 1. For operation with permanent speed droop the rate servo piston 22 only is connected for fuel rack or throttle movement and provided with spring return as indicated at 23S in broken lines, the spring preferably being the same one, 15"S as that shown for fuel-reducing movement of main servo piston 15'.

*Lever and Linkage (Design Notes)*

In actual physical embodiments of the present subject governor the lever component lengths (as AD/DB, FIG. 1 and similar components in FIG. 2) are small in comparison with the lengths of connected rods or links such as 11 and 23 (or 11', 23, 34, 35). One way in which the necessary lever ratio adjustments such as described in connection with points A, B and C can be accomplished without involving change in input or output positions is to design the levers as arcuate members (not illustrated) curved as about the joints or points of pivotal connection (as 11a' or 36 FIG. 3) between the links and (e.g.) valves 12 and 20. FIG. 3 further shows schematically a physical relationship of levers, links and connecting pivotal adjustment points such as would be appropriate for the governor organized as shown in FIGS. 2 or 4. In FIG. 3 the effective lever 25' of FIG. 2 involves two lever members having a common fixed pivot axis F, F'. Thus a single pivot pin can support the levers 25' and 25".

Figure 5:
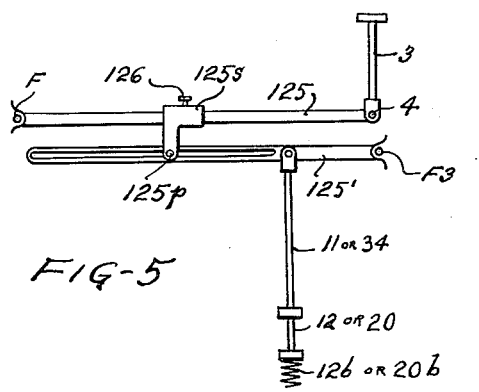
FIG. 5 is a fragmentary view showing a compound lever arrangement for ratio adjustment in the operating and feedback linkage of the governor.

*Modified Lever Ratio Adjusting Means (Ref. FIG. 5)*

It would be desirable from the standpoint of minimizing static frictional forces such as tend to restrain free movement of valve plungers to eliminate pivot joints as at 11a' and 36 FIG. 3 hence minimize side thrust forces on the plungers. Such can be accomplished through the use of compound levers as shown diagrammatically at 125 and 125' in FIG. 5. The lever members have relatively opposite supporting fulcrums F and F3. Such compound lever mechanisms also enable wider ranges of adjustment in a given horizontal space than would levers of the sort shown by FIG. 3. Slider 125S carried by lever member 125 and carrying a suitable set screw 126 carries a pivot pin 125p movable along a slot in member 125' to change the input and output ratio (point 4 of governor tachometer G being illustrative of input and valves 12 or 20 as output). Valve stems 11 or 34 as indicated require no pivot joints because their upper ends would move substantially along straight vertical lines during operation.

*Double Acting Type Servomotors*

FIG. 4 shows the present hydraulic governor mechanism with control linkage generally according to FIG. 2 but adapted for use with a double acting, hence two-way-symmetrically-operating, servomotor such as requires a four-way-pilot valve as shown at 12f. Additionally FIG. 4 shows use of the present governor system or mechanism for electrical load change responsive speed governing via the linkage L" approximately according to FIG. 2. Elements in FIG. 4 corresponding to those of FIG. 2 are similarly identified.

For proportional plus derivative response via four-way valves (e.g. 12f and 20f) and double acting servomotors as shown it is necessary to use primary and secondary rate action fluid circuits. One such circuit 22"S is shown connected in parallel with the operating circuit 15"t of the main servomotor 5c and its associated four way valve system. The other circuit, 22'p, is connected between rate valve 20f and rate servomotor 7" wholly independently of circuit 22"S, and the main and auxiliary rate pistons 22' and 22" are suitably interconnected (e.g.) as by a link or piston rod 23' for concurrent movement of the two pistons. The reason mutually separated primary and secondary control circuits such as 22'p and 22"S are required will be apparent from consideration of the circumstance that if the two feed lines of circuit 22'p FIG. 4 controlled by rate valve 20f were to be connected to corresponding sides of circuit 15"t (parallel cross connections) in order to modify the speed of motion of the servomotor piston 15" as a function of rate of change of speed error, the operation of pilot valve 12f would, during transients, influence or modify the rate servo piston movement, rendering the rate servo and rate valve system incapable of performance to secure accurate derivative response on part of the governor unit.

Except for the difference in pilot and rate valve action and separation of fluid circuits as described above, the systems and mechanisms of FIGS. 2 and 4 necessarily perform the same functions, therefore no specific description of operation in the case of FIG. 4 appears necessary. The upper chamber of auxiliary or secondary rate piston 22" is connected to the lower side of circuit 15"t as illustrated so that (e.g.) downward movement of primary and secondary servo pistons 22' and 22" during engine acceleration will add operating fluid in the upper chamber of main servomotor 15" to increase servo piston speed and the reverse differentiating or compensating action will occur as an overspeed error is reduced to zero. The double acting servo arrangement as shown by FIG. 4 has the same mode of operation capabilities as the governor systems of FIGS. 1 and 2 assuming three way valves 33 and 33a in the secondary rate servo circuit 22"S (now turned for proportional plus rate governing). For droop operation the valves are turned (e.g. 90° clockwise) so as to spill oil from both chambers of piston unit 7"S. For simple isochronous operation (piston 15" of servomotor 5c then connected to meter fuel) the valves 33 and 33a are turned as in the case of droop operation just above described.

*Electrical Load Transient Sensing Control*

Above title indicated feature is shown schematically (not in detail) only in association with FIG. 4 although applicable to any form of the present governor mechanism. Normally fixed fulcrum F" in FIG. 4 is shown as though supported by an output member (armature 41) of a solenoid or electromagnet coil 40 adapted to be supplied with current at a variable value from or as a function of the electrical output of a generator operated by the governed engine.

It is assumed that the armature 41 is suitably spring biased to hold it and to cooperate with governor G in holding the rate valve 20f in neutral or off position at steady state. Also since the rate valve for the sake of previously described derivative response action (solenoid armature 41 then rigidly held inoperative by means not shown) would be highly sensitive, a suitable damping means (e.g., conventional dashpot 42) would normally or usually be needed in order to minimize valve chatter.

When an electrical signal operates through the presently disclosed rate valve and servo system (as via the electromagnet 40, 41 and fulcrum F") overcorrections would be expected to occur in event of sudden electrical load changes. The flyweight governor G in such case acts principally through the pilot valve 12f and main output piston 15" as a "vernier" adjustment to compensate for the error involved in scheduling the rate piston as a function of load.

I claim:

1. A hydraulic governor comprising an error measuring or detecting unit, a hydraulic servomotor having an output member operative to effect correction of error, a pilot valve connected for movement by said unit in opposite directions to initiate error-correcting movements of the output member proportionally to detected amounts of error, and differentiating means including a differentiating valve member connected for movement by said unit and operating to cause back and forth movement of a differentiating wall member movable in and transversely blocking a differentiating fluid channel leading to the servomotor, so that movement of fluid contained in the channel can have two way action to modify the proportional movements of the output member as functions of rate of change of error, said differentiating means further including feedback lever means connecting said differentiating wall member to the differentiating valve member and operating thereon in a manner to move that valve member to closed position during movement of the differentiating wall member in each direction.

2. The governor according to claim 1, wherein a feedback lever member is operatingly connected between the error measuring unit and the differentiating wall member, and the differentiating valve member is adjustably connected to the lever member in a manner to enable change in the ratio of operating movement of said unit and operated movement of the differentiating valve member.

3. The governor according to claim 2, wherein the pilot valve has an operating link adjustably connected to the feedback lever member in a manner to enable change in the ratio of operating movement of the unit and the operated movement of the pilot valve.

4. The governor according to claim 3, wherein the differentiating valve member is connected to the feedback lever member via the adjustable connection of the pilot valve link and lever member, so that adjustment of input/output ratio to the pilot valve predeterminedly varies the ratio of movement between the error measuring unit and the differentiating valve member.

5. The governor according to claim 1, wherein a feedback lever member is operatingly connected between the differentiating wall member and the error measuring unit, and input and output movements of the unit and wall member respectively are communicated to the differentiating valve member by an adjustable connection between the valve member and lever member lengthwise of the lever member.

6. The governor according to claim 5, wherein the feedback lever member has two parts swingable about oppositely disposed fulcrums, and a slidable pivotal connection between the two parts is operative to change input to output ratios.

7. The governor according to claim 1, wherein the differentiating valve member is four-way-acting and controls a double acting piston in a primary fluid circuit, and a separate secondary fluid circuit connected to the governor servomotor to modify its output movements according to rate of change of error.

8. The governor according to claim 1 wherein the pilot valve and differentiating valve member are constituted by respective valve plungers mechanically in parallel relationship and having linkage including separate pivotal connections with the error measuring unit, further characterized by provision of springs arranged for action axially on the valve plungers toward the linkage in a manner continuously to take up slack in the pivotal connections.

9. In a hydraulic governor system comprising an error measuring means connected to act through linkage in and of two servomechanisms each having a pilot or control valve comprising a valve plunger and valve sleeve therefor and having a piston whose movement is controlled by movements of the associated valve plunger, the valve plungers being mechanically in parallel relationship, the linkage including a feedback lever between one valve plunger and the error measuring means and extending transversely of the parallel axes of the valve plungers and pivotally connected to the valve plungers, and means tending to eliminate or minimize mechanical lost motion in the pivotal connections, said means comprising springs acting on the valve plungers in a direction toward the linkage.

10. A proportionally plus rate responsive hydraulic governor comprising two valve plungers in separate valve sleeves concurrently controlling relatively parallel fluid channels leading to a control chamber or pair of chambers of a main output servomotor of the governor, and a single error measuring means connected to operate the two valve plungers through a common lever-linkage system, and a movable wall transversely sealing one of the channels and connected to one of the valve plungers through said linkage system and acting as feedback to the associated valve plunger whereby to add and subtract fluid input and output in the servomotor chamber or chambers as rate functions of displacements of the valve plunger which controls the movements of the movable wall.

11. The governor according to claim 10, wherein the valve plunger and sleeve through which movements of the movable wall are controlled have port means designed with a higher flow coefficient than that of the other valve plunger and sleeve.

12. A hydraulic governor comprising a source of pressure fluid, an error-measuring unit which is lever-connected to a pilot valve and to an auxiliary valve for movement of the valves out of neutral positions as proportional and rate functions of predetermined error-responsive movements of the unit, a governor output motor member having a control chamber, two fluid channels in mutually parallel relationship operatingly connecting the control chamber to said pressure source via respective valves, the channel between the control chamber and auxiliary valve being closed between its ends by a movable wall having a feedback connection with the auxiliary valve and operating to close that valve whenever the valve is moved by said unit out of neutral position.

13. The governor substantially according to claim 12, wherein the channel containing the movable wall has a manually operable, governor mode selecting valve in it disposed between said wall and the governor servomotor, the mode selecting valve having one operating position allowing free flow in the channel therethrough and having another operating position blocking flow therethrough to or from the servomotor and meanwhile spilling fluid from the portion of the channel containing said wall.

14. A proportionally plus rate responsive hydraulic governor, comprising a source of hydraulic pressure fluid, an error-measuring unit, a proportional valve and a rate valve differentially connected for movement out of respective neutral positions by said unit, a governor output fluid motor and a proportional fluid passage connecting a control chamber of the motor to said source via the proportional valve, a two part fluid passage means operatingly in parallel to the first passage, having one end portion connected to said source via the rate valve and having a separate end portion fluid connected to the motor control chamber, a wall member movable axially in said passage means and mutually isolating fluid contained in said two end portions thereof, and a feedback connection between the movable wall member and the rate valve and operating to restore the rate valve to neutral position after each movement thereof out of that position.

15. A hydraulic governor comprising a source of pressure fluid, an error measuring unit, a double acting governor output servomotor arranged to regulate a condition to be controlled, a four-way-acting pilot valve connected for operation by the unit and fluid-connected to the servomotor to admit and discharge fluid of said source into and out of oppositely disposed control chambers of the servomotor, a double acting auxiliary servomotor and four-way-acting valve therefor separately connected to said error measuring unit for operation thereby, and a two way acting pump connected for operation by the axuiliary servomotor and having relatively oppositely arranged pressure chambers connected to respective control chambers of the governor output servomotor so as to modify condition-regulating performance thereof.

16. The governor substantially according to claim 15, wherein a manually operable governor mode selecting 3-way valve is operatingly arranged between each pressure chamber of the pump and a connected control chamber of the governor output servomotor, each 3-way valve having one operating position communicating a pump pressure chamber to a servomotor control chamber and another operating position discommunicating those control and pressure chambers and meanwhile spilling fluid from the associated pump pressure chamber.

17. A hydraulic governor having a source of hydraulic pressure fluid, a servomotor having a pressure chamber and an output member movable therein, an error detecting unit, pilot valve mechanism connected for operation by said unit, two parallel fluid channels connected to said source through the valve mechanism and connected to the pressure chamber, a movable wall transversely sealing one of the channels so as to form a pump capable of moving fluid therein, said wall having a feedback connection wtih the pilot valve mechanism and operating thereon to block flow of fluid in said one channel as a function of predetermined movement of said wall.

18. A hydraulic governor comprising an error measuring or detecting unit, a hydraulic servomotor having an output member operative to effect correction of error, a pilot valve mechanism connected for movement by said unit to control fluid in a channel leading to the servomotor to initiate error-correcting movements of the output member proportionally to detected amounts of error, the pilot valve mechanism including a differentiating valve member connected for operation to control movement of a differentiating wall member in and transversely blocking another fluid channel leading to the servomotor, so that movement of fluid contained in said other channel can modify the proportional movements of the output member, and feedback lever means connecting said differentiating wall member to the differentiating valve member and operating thereon in a manner to move that valve member to closed position as a function of movement of said wall member.

References Cited in the file of this patent
UNITED STATES PATENTS

| | | |
|---|---|---|
| 2,734,490 | Moulton | Feb. 14, 1956 |
| 2,878,785 | Rexford | Mar. 24, 1959 |
| 2,931,375 | Lewis | Apr. 5, 1960 |